(12) United States Patent
Gozum et al.

(10) Patent No.: US 8,691,889 B2
(45) Date of Patent: *Apr. 8, 2014

(54) LIGHTWEIGHT WALL REPAIR COMPOUNDS

(71) Applicant: 3M Innovative Properties Company, St. Paul, MN (US)

(72) Inventors: John E. Gozum, Stillwater, MN (US); Richard A. Mallo, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,770

(22) Filed: Jul. 10, 2013

(65) Prior Publication Data

US 2013/0296462 A1 Nov. 7, 2013

Related U.S. Application Data

(62) Division of application No. 12/997,212, filed as application No. PCT/US2009/045778 on Jun. 1, 2009, now Pat. No. 8,507,587.

(60) Provisional application No. 61/061,274, filed on Jun. 13, 2008.

(51) Int. Cl.
*C08J 9/32* (2006.01)

(52) U.S. Cl.
USPC .......................... 523/218; 523/219; 523/220

(58) Field of Classification Search
USPC ......................................... 523/218, 219, 220
See application file for complete search history.

(56) References Cited

U.S. PATENT DOCUMENTS

| | | | |
|---|---|---|---|
| 3,386,223 A | 6/1968 | Wegwerth | |
| 3,907,725 A | 9/1975 | Forte et al. | |
| 4,283,320 A | 8/1981 | Carroll et al. | |
| 4,391,647 A | 7/1983 | Deer et al. | |
| 4,629,751 A | 12/1986 | Montgomery | |
| 4,824,879 A | 4/1989 | Montgomery et al. | |
| 4,904,709 A | 2/1990 | Hermele | |
| 5,112,400 A | 5/1992 | Nae et al. | |
| 5,336,318 A | 8/1994 | Attard et al. | |
| 5,863,975 A | 1/1999 | Whitton et al. | |
| 6,358,309 B1 | 3/2002 | Langford | |
| 7,037,865 B1 | 5/2006 | Kimberly | |
| 8,507,587 B2 * | 8/2013 | Gozum et al. ................. 523/218 |
| 2006/0096074 A1 | 5/2006 | Foster et al. | |
| 2006/0142456 A1 | 6/2006 | Langford | |

FOREIGN PATENT DOCUMENTS

| | | |
|---|---|---|
| JP | H06-287544 | 10/1994 |
| JP | H07-278463 | 11/1994 |
| JP | 2002-531369 | 9/2002 |
| WO | WO 00/34200 | 6/2000 |

OTHER PUBLICATIONS

3M Material Safety Data Sheet: 3M Brand Spakfast Wall Repair Compound.
3M Material Safety Data Sheet: 3M Wall Repair Compound.
Gozum, John E., U.S. Appl. No. 13/938,801, filed Jul. 10, 2013.
International Search Report, PCT/US2009/045778, mailed Jan. 12, 2010, 3 pages.

* cited by examiner

*Primary Examiner* — Edward Cain
(74) *Attorney, Agent, or Firm* — Kenneth B. Wood

(57) ABSTRACT

Herein are disclosed wall repair compounds comprising at least one or more polymeric binder latex emulsions, one or more inorganic fillers, and comprising an amount of organic polymeric thickener that is less than about 0.1 percent by weight based on the total weight of the wall repair compound. In certain embodiments, the wall repair compound comprises an inorganic filler system selected such that such that synthetic inorganic fillers comprise essentially 100 percent of the inorganic filler used. In certain embodiments, the wall repair compound comprises one or more glycol ether smoothing agents.

19 Claims, No Drawings

LIGHTWEIGHT WALL REPAIR COMPOUNDS

CROSS REFERENCE TO RELATED APPLICATIONS

This application is a divisional of U.S. patent application Ser. No. 12/997,212, now allowed, which was a national stage filing under 35 U.S.C. 371 of PCT/US2009/045778, filed Jun. 1, 2009, which claimed priority to U.S. Provisional Application No. 61/061,274, filed Jun. 13, 2008, the disclosures of all of which are incorporated by reference in their entirety herein.

BACKGROUND

Interior walls of buildings are often constructed using gypsum wallboard panels (sometimes referred to as drywall). Where cavities, recesses, holes, etc., may be present (due to imperfections or damage) it is common to use wall repair compound (often referred to as "spackling") to fill such cavities. Conventional wall repair compounds often include one or more inorganic fillers, one or more polymeric resin binders, and various thickeners and other additives. In particular, lightweight wall repair compounds have been developed which often contain, among other inorganic fillers, relatively low density fillers such as glass bubbles, hollow silica, or expanded perlite.

Wall repair compounds often comprise a significant amount of water (e.g., greater than about 20 percent by weight); such that, after the wall repair compound is applied to a wall, the water evaporates over a period of time resulting in the formation of a dried, hardened material which can be sanded, painted, etc.

SUMMARY

Herein are disclosed lightweight wall repair compounds comprising at least one or more polymeric binder latex emulsions and inorganic fillers; and, comprising an amount of organic polymeric thickener that is less than about 0.1 percent, by weight, of the as-formulated wall repair compound.

In various embodiments, the lightweight wall repair compounds disclosed herein comprise an inorganic filler system selected such that such that synthetic inorganic fillers (as defined herein) comprise at least 95, 99, or essentially 100 percent, by weight, of the inorganic filler in the wall repair compound. An advantage of at least some of these embodiments is that synthetic inorganic fillers may be viewed (e.g., by end users) as preferable to natural inorganic mineral fillers.

In certain embodiments, the lightweight wall repair compounds disclosed herein comprise one or more smoothing agents that have been found to advantageously effect the consistency of the compound such that it can be easily applied (for example, such that it is easily spreadable yet does not run, sag or slump once applied, e.g. to a vertical wall). Such smoothing agents (described in further detail herein) comprise hydrocarbon molecules comprising exactly one hydroxyl group and further comprising exactly one or exactly two ether groups, and often referred to as glycol ethers. The inventors have found that such glycol ether smoothing agents can be added at low amounts (e.g., from about 0.025 to about 2.5 percent, by weight) with advantageous, and unexpected, technical effects.

The inventors have found that at least certain of the compositions disclosed herein can advantageously result in very low shrinkage upon drying of the applied compound, which can enable the compound to dry without cracking, deforming, etc. A further advantage of at least certain embodiments disclosed herein is the ability of the wall repair compound to survive freeze-thaw cycles in usable form without the necessity of adding components such as anti-freeze compounds. An additional advantage of at least certain embodiments disclosed herein is that, in the event that the wall repair compound has been accidentally allowed to lose a small amount of water by evaporation (e.g., by the lid of the storage container being incompletely sealed) the compound may be able to be reconstituted substantially into its original form by way of stirring a small amount of water into the compound.

Thus in one aspect, herein is disclosed a wall repair compound, comprising: from about 20 percent to about 80 percent by weight aqueous latex binder emulsion; from about 20 percent to about 70 percent by weight of an inorganic filler system, wherein the inorganic filler system is comprised of essentially 100 percent by weight synthetic inorganic filler; from about 0.025 percent to about 2.5 percent by weight of at least one glycol ether smoothing agent that comprises exactly one hydroxyl group and exactly one or exactly two ether groups; and, less than about 0.1 percent by weight of organic polymeric thickener.

In another aspect, herein is disclosed a wall repair compound comprising from about 20 percent to about 70 percent by weight of an inorganic filler system, wherein the synthetic inorganic filler comprises substantially spherical synthetic particles and wherein the particles comprise a set of relatively large diameter glass bubbles and a set of relatively small ceramic microspheres, with the ratio of the median particle size of the glass bubbles to the median particle size of the ceramic microspheres being in the range of about 5:1 to about 40:1.

These and other aspects of the invention will be apparent from the detailed description below. In no event, however, should the above summaries be construed as limitations on the claimed subject matter, which subject matter is defined solely by the attached claims, as may be amended during prosecution.

Although terms such as "first" and "second", and "large" and "small", may be used in this disclosure, it should be understood that those terms are used in their relative sense only.

DETAILED DESCRIPTION

Herein are disclosed compounds suitable for filling and repairing cavities, cracks, holes, or other imperfections in a wall surface (such as a gypsum wallboard surface). Such compounds comprise at least one or more polymeric binder latex emulsions and one or more inorganic fillers and further comprise an amount of organic polymeric thickener that is less than about 0.1 percent, by weight, based on the total weight of the wall repair compound as formulated.

The wall repair compound disclosed herein comprises an inorganic filler system that comprises one or more inorganic fillers. In various embodiments, the inorganic filler system comprises at least about 20, 30, or 40 percent, by weight, of the wall repair compound (this and all other percentages by weight disclosed herein are based on the total as-formulated weight of the wall repair compound (i.e., including water), unless otherwise noted). In further embodiments, the inorganic filler system comprises at most about 70, 60 or 50 percent, by weight, of the weight of the wall repair compound as formulated.

Inorganic fillers are often naturally occurring minerals which are mined from the earth. In this context, a natural inorganic filler is thus defined herein as a mineral that has been extracted from the earth in its naturally occurring form, and, while possibly being subjected to purification and/or modification processes such as filtering, screening, degritting, bleaching, beneficiation, centrifugation, etc., is used while still substantially in its naturally occurring form (although possibly in a more purified or concentrated form). Such natural inorganic fillers often comprise substantially crystalline structures, and are often comprised substantially of particles that are substantially non-spherical and/or that comprise somewhat irregular or nonuniform, or very irregular or nonuniform, shapes. In this context, a mineral which has been calcined by exposure to a temperature sufficient to drive off waters of hydration (but not sufficient to cause melting of the material or to cause a change in the structure of the material from crystalline to amorphous), is still considered to be a natural inorganic filler. In this context, the term inorganic fillers includes such fillers as have been modified to include organic surface groups, coatings, etc.

Natural inorganic fillers can include for example calcite, witherite, rutile, anatase, ilmenite, mica, sericite, perlite, talc, limestone, silica, barite, gypsum, calcined gypsum, kaolinite, montmorillonite, attapulgite, illite, saponite, hectorite, beidellite, stevensite, sepiolite, bentonite, pyrophyllite, diatomaceous earth, and the like.

In certain embodiments, the inorganic filler systems used herein are comprised of at least 95 percent, at least 99 percent, or essentially 100 percent, by weight, of synthetic inorganic filler. In this context, essentially 100 percent by weight synthetic inorganic filler means that all of the inorganic filler chosen to be used in the formulation of the wall repair compound is synthetic, such that only such (possibly undetectable) trace amounts of naturally occurring mined mineral fillers are present as may be known to one of skill in the art as being inherent or unavoidable in the standard production processes of such synthetic inorganic fillers.

The term synthetic inorganic filler includes any filler that has been transformed, regenerated, recrystallized, reconstituted, etc. from an original state (which may be its naturally occurring, mined state) into its current state by a chemical synthesis process (e.g., precipitated from solution, generated by flame hydrolysis, etc.) or by a physical synthesis process (e.g., precipitated from a gaseous phase, solidified by way of a sol-gel process, etc.). The designation synthetic inorganic filler also includes any filler that has been substantially transformed from an original state (which may be its naturally occurring, mined state) into its current state by a physical synthesis process of being brought into an at least partially softened or molten state and then solidified by cooling, such that any substantially crystalline structure that may have existed in the natural state is substantially erased such that the material is now in a substantially amorphous form (e.g., comprising less than about 0.5 percent crystallinity by weight). Such processes may include for example melt processing, flame-fusion, and the like.

In this context, synthetic inorganic fillers include for example so-called glass bubbles (such as those available from 3M Company of St. Paul, Minn., under the trade designation 3M Glass Bubbles), ceramic microspheres (such as those available from 3M Company under the trade designation 3M Ceramic Microspheres), synthetic clays (e.g., synthetic silicate clays such as those available under the trade designation Laponite from Southern Clay Products, Gonzales, Tex., precipitated silica, fumed silica, vitreous silica, synthetic titanium dioxide (as made, for example, by the sulfate process or the chloride process), synthetic (precipitated) calcium carbonate (as made, for example, by passing carbon dioxide through a solution of calcium hydroxide), and the like.

In this context, the term synthetic inorganic fillers includes such synthetic inorganic fillers as have been modified to include organic surface groups, coatings, etc.

In various embodiments, the synthetic inorganic filler comprises less than 0.5, 0.1, or 0.05 percent crystalline material, by weight, when a bulk sample of the filler is tested by X-Ray Diffraction methods.

In certain embodiments the synthetic inorganic filler used herein comprises a bimodal particle size mixture of larger synthetic inorganic filler particles and smaller synthetic inorganic filler particles. In various specific embodiments, the synthetic inorganic filler used herein comprises a bimodal particle size mixture of synthetic inorganic filler particles comprising a particle size ratio of larger particle size filler to smaller particle size filler (as obtained by ratioing the median particle size of the two filler populations) of at least about 5:1, 10:1 or 15:1. In various specific embodiments, the particle size ratio is at most about 40:1, 30:1, or 20:1.

In various embodiments, the larger particle size synthetic inorganic filler particles comprise a median particle size of at least about 15, 30 or 40 microns, and of at most about 80, 65 or 55 microns. In various embodiments, the smaller particle size synthetic inorganic filler particles comprise a median particle size of at least about 1, 2, or 3 microns, and of at most about 15, 10 or 5 microns.

In a particular embodiment, such synthetic inorganic fillers are comprised of substantially spherical particles. In this context, substantially spherical denotes that a substantial majority of the particles are spherical except for such occasional deviations, deformities, etc. as are known to those of skill in the art to be occasionally encountered in the manufacturing processes used to produce the particles (for example, somewhat misshapen particles may be occasionally produced, two or more particles may agglomerate or adhere to each other, and so on).

Suitable substantially spherical synthetic inorganic fillers as defined herein include so-called glass bubbles (such as those available from 3M Company of St. Paul, Minn., under the trade designation 3M Glass Bubbles), and ceramic microspheres (such as those available from 3M Company under the trade designation 3M Ceramic Microspheres). Such glass bubbles can be synthesized, for example, by a process as described in U.S. Pat. Nos. 3,365,315 and 4,391,646. Such ceramic microspheres can be synthesized, for example, by sol-gel processes, as described for example in U.S. Pat. Nos. 3,709,706 and 4,166,147. Other methods potentially useful for making ceramic particles and/or microspheres are described in, for example, U.S. Pat. No. 6,027,799.

In the certain embodiments the synthetic inorganic filler used herein comprises a bimodal particle size mixture of larger substantially spherical synthetic inorganic filler particles and smaller substantially spherical synthetic inorganic filler particles. In various specific embodiments, the synthetic inorganic filler used herein comprises a bimodal particle size mixture of substantially spherical synthetic inorganic filler particles comprising a particle size ratio of substantially spherical larger particle size filler to substantially spherical smaller particle size filler (as obtained by ratioing the median particle size of the two filler populations) of at least about 5:1, 10:1 or 15:1. In various specific embodiments, the particle size ratio is at most about 40:1, 30:1, or 20:1.

In particular embodiments, the larger particle size synthetic inorganic filler comprises glass bubbles and the smaller particle size synthetic inorganic filler comprises ceramic microspheres. In various embodiments, the glass bubbles comprise a median particle size of at least about 15, 30 or 40 microns, and of at most about 80, 65 or 55 microns. In various embodiments, the ceramic microspheres comprise a median particle size of at least about 1, 2, or 3 microns, and of at most about 15, 10 or 5 microns.

In such compounds, the glass bubbles generally comprise a true density that is less than that of the ceramic microspheres. Thus in various embodiments, the ceramic microspheres comprise a true density of at least about 2.0 or 2.2 g/cc, and of at most about 2.6 or 2.4 g/cc. In various embodiments, the glass bubbles comprise a true density of at least about 0.1, 0.15, or 0.2 g/cc, and of at most about 0.6, 0.4, or 0.3 g/cc.

In such compounds, the glass bubbles are generally present at an amount that is equal to or higher than the amount of ceramic microspheres. Thus in various embodiments, the glass bubbles and the ceramic microspheres are present at a weight ratio of at least about 1:1 glass bubbles/ceramic microspheres, or at least about 1.5:1 glass bubbles/ceramic microspheres. In various embodiments, the glass bubbles and the ceramic microspheres are present at a weight ratio of at most about 3:1 glass bubbles/ceramic microspheres, or at most about 2:1 glass bubbles/ceramic microspheres.

The inventors have observed that the use of such substantially spherical fillers as described above, and in particular the use of a bimodal mixture of such fillers, can help provide a wall repair compound that spreads extremely easily and yet does not sag, run or slump to an excessive degree when applied to a vertical wall.

The wall repair compound disclosed herein comprises at least one polymeric resin binder. Such binders are often supplied as an aqueous latex emulsion (for example comprising between 40-60 percent solids of polymeric resin binder, in water). Polymeric resins potentially suitable for binders in the present application include for example the well-known acrylic polymers and copolymers, polyvinyl acetate polymers and copolymers, ethylene vinyl acetate polymers and copolymers, styrene-butadiene polymers and copolymers, polyacrylamide polymers and copolymers, natural rubber latex, natural and synthetic starch, casein, and the like. Such binders can be used alone or in combination with one another.

In various embodiments, the binder latex emulsion can comprise at least about 20, 30, or 40 percent, by weight, of the wall repair compound. In further embodiments, the binder latex emulsion can comprise at most about 80, 70 or 60 percent, by weight, of the wall repair compound.

In a specific embodiment, the polymeric resin binder comprises a vinyl acrylic polymer, copolymer or blend. Such materials can comprise any of a wide variety of polymers and/or copolymers made for example by the polymerization of ethylenically unsaturated monomers that comprise acrylate and/or methacrylate groups. Such vinyl acrylic polymeric binder resins are widely known in, for example, the paint industry. Other monomers, polymers, additives, etc. may also be present for a variety of purposes. Such vinyl acrylic binders have the particular advantage that many common paints contain similar binders, thus the dried wall repair compound may not need to be primed to avoid such common problems as flashing or reverse flashing, upon painting of the wall containing the dried wall repair compound.

In various embodiments, the polymeric resin binder comprises a glass transition temperature ($T_g$) of around room temperature (e.g., from about 15° C. to about 35° C.; or, from about 20° C. to about 30° C.). The term "glass transition temperature" is of course a term well known in the art and generally relates to a softening temperature indicative of the onset of long range translational motion of polymer molecules. A $T_g$ in the above-described temperature range may render the binder well suited for fusing and coalescing under ambient conditions after the wall repair compound has been applied and allowed to dry. Also, a $T_g$ that is excessively higher than room temperature might be disadvantageous in that in the dried compound the binder might be below its $T_g$ thus in a relatively brittle state thus rendering the dried compound excessively susceptible to cracking. Conversely, a $T_g$ that is excessively lower than room temperature might be disadvantageous in that the dried wall repair compound might be so soft or rubbery as to make it difficult to perform operations such as sanding. It may also be advantageous for the binder to have a relatively broad $T_g$ (e.g., exhibiting a somewhat broad $T_g$ peak covering an interval of at least about 5 or 10° C.) such that the binder does not exhibit a relatively sharp change in physical properties upon changes in ambient temperature.

In a particular embodiment, the latex binder emulsion comprises the acrylic binder latex emulsion available (as a 50 percent solids latex emulsion) from Dow Chemical of Midland, Mich., under the trade designation UCAR 626.

Conventional wall repair compounds often comprise organic polymeric thickeners. Such organic polymeric thickeners are often used, for example to provide an increased viscosity of the wall repair compound such that the compound does not excessively sag, slump or run (e.g., when applied to a vertical wall). Such organic polymeric thickeners are often designed to exhibit their thickening effect by their interaction with the water that is present in the wall repair compound. Thus, commonly used organic polymeric thickeners are often water soluble or water swellable (e.g., at around 22° C.). (Such materials may be occasionally referred to in the art as gelling agents, bodying agents, water retention agents, etc.). Often, such materials are polyhydroxy compounds that have at least two, and often ten, twenty, or more, hydroxyl groups.

Such organic polymeric thickeners can be synthetic, can be natural products, and/or can be obtained or derived from natural products. Such thickeners can include for example polysaccharides and derivatives thereof, for example the well known cellulose ethers (e.g., methyl cellulose, hydroxypropyl cellulose, hydroxypropyl methyl cellulose, hydroxyethyl cellulose, hydroxyethyl methyl cellulose, hydroxyethyl hydroxypropyl cellulose, ethylhydroxyethyl cellulose, and sodium carboxymethyl cellulose). Such thickeners can also include for example polyethylene glycol, polyethylene oxide (and/or polyethylene oxide/polypropylene oxide copolymers), polyvinyl alcohol, polymers or copolymers of ethylenically unsaturated carboxylic acids and their derivatives, such as acrylic acid and acrylamide, guar gum, xanthan gum, alginates, tragacanth gum, pectin, amylopectin, dextran, polydextrose, and the like.

Such organic polymeric thickeners often comprise a relatively high molecular weight, e.g. greater than 500 g/mole, or greater than 5000 g/mole or higher.

Such organic polymeric thickeners can also be recognized by those of ordinary skill in the art by, for example, their ability to increase, often substantially increase, the viscosity of water upon their addition to water.

The inventors have found that it in certain embodiments it is advantageous to maintain the concentration of such organic polymeric thickeners below a predetermined amount (of the wall repair compound as formulated). This has been observed by the inventors to appear to be able to help achieve a desirably low shrinkage of the compound upon drying. The discoveries disclosed herein thus enable the formulation of low-shrink wall repair compounds that also comprise unexpectedly advantageous resistance to sagging, running or slumping, even at such low levels (or in the absence) of thickener. Thus, in various embodiments, the wall repair compounds disclosed herein comprise less than 0.1, 0.05, or 0.02 percent, by weight, organic polymeric thickener. In such small quantities, such organic polymeric thickeners may serve primarily only as a processing aid (for example, to help in dispersing the inorganic filler(s) in the aqueous mixture) rather than serving their conventional purpose in the art, which is to thicken the compound so it does not run, sag or slump when applied to a vertical wall.

In a particular embodiment, the inventors have found that the maintaining of a level of organic polymeric thickener of less than 0.1, 0.05, or 0.02 percent by weight, may be employed in a wall repair compound comprising the above-described bimodal mixture of substantially spherical synthetic inorganic fillers, to result in a compound with a particularly advantageous combination of smoothness, ease of spreading, and resistance to shrinkage upon drying.

The inventors note that certain natural or synthetic inorganic fillers (for example, clays such as attapulgite, bentonite, montmorillonite, illite, kaolinite, sepiolite, the synthetic clay available under the trade designation Laponite from Southern Clay Products, etc.), while not necessarily water soluble, are known to exhibit a thickening (e.g., viscosity-increasing) effect when dispersed in water. Such materials (particularly those that absorb water and/or swell upon exposure to water) have commonly been used as thickeners in wall repair compounds (they are also occasionally referred to in the art as rheology modifiers, non-leveling agents, etc.), and are known in the art to contribute to shrinkage upon drying (as discussed, for example, in U.S. Pat. No. 4,824,879). Thus, in certain embodiments, the wall repair compounds disclosed herein comprise less than 0.1, 0.05, or 0.02 percent, by weight, of (natural or synthetic) inorganic thickening filler clay. In a particular embodiment, the wall repair compounds disclosed herein comprise less than about 0.1 percent by weight of inorganic thickening filler clay and further comprise less than about 0.1 percent by weight of organic polymeric thickener.

In certain embodiments, the lightweight wall repair compounds disclosed herein comprise one or more smoothing agents which have been found to advantageously affect the consistency of the compound. Specifically, the inventors have found such smoothing agents to impart a smooth consistency to the compound (absent the smoothing agent the compound may take on a more crumbly appearance) such that the compound is more easily spreadable yet does not run, sag, slump or crumble, once applied, e.g. to a vertical wall. In contrast to the above-described thickeners, such smoothing agents appear to function to reduce the apparent viscosity of the wall repair compound rather than to increase it (while, again, not causing unacceptable sagging or slumping).

The presence of such a smoothing agent has also been found by the inventors to improve the ability of the compound to be brought back to the above-described smooth consistency by the addition of a small amount of water, in the event that the compound is inadvertently allowed to lose water (e.g., by the container being left open for a period of time). In the absence of such a smoothing agent, the inventors have found that the addition of water may only serve to reduce the viscosity of the compound such that unacceptable sagging or slumping results.

In a particular embodiment, the inventors have found that such smoothing agents may be employed in a wall repair compound comprising the above-described bimodal mixture of substantially spherical synthetic inorganic fillers, to result in a compound with a particularly advantageous combination of smoothness, ease of spreading, and resistance to running, slumping, or sagging.

In a further particular embodiment, the inventors have found that such smoothing agents may be employed in a wall repair compound comprising the above-described bimodal mixture of substantially spherical synthetic inorganic fillers, and comprising a level of organic polymeric thickener of less than 0.1, 0.05, or 0.02 percent by weight, to result in a compound with a particularly advantageous combination of smoothness, ease of spreading, resistance to shrink upon drying, and resistance to running, slumping, or sagging.

Such viscosity-reducing smoothing agents comprise hydrocarbon molecules comprising exactly one hydroxyl group and further comprising an ether linkage. In one embodiment, the smoothing agent comprises one or more of the compounds generally known in the art as glycol ethers and comprising a linear hydrocarbon chain with exactly one or exactly two ether groups in the chain, and bearing a single hydroxyl group. The hydroxyl group may for example be attached to a terminal carbon of the chain, or attached to a carbon adjacent to a terminal carbon of the chain, or attached to some other carbon of the molecule. The linear chain may also comprise one or more methyl groups or other alkyl groups attached to the carbons of the chain.

Such glycol ether smoothing agents typically comprise a relatively low molecular weight (e.g., from about 90 g/mole to about 250 g/mole); are typically liquid at room temperature (e.g., 22° C.); and, while typically being partially or completely miscible with water, do not act to substantially increase the viscosity of water when added to water.

As such, these glycol ether smoothing agents are distinguished from organic polymeric thickeners such as the above-described relatively high molecular weight polyhydroxy materials that comprise multiple hydroxyl groups. As such, they are also distinguished from organic polymeric thickeners such as poly(ethylene oxide) and/or polyethylene glycol and derivatives thereof, which, although possibly not possessing hydroxyls, possess multiple (e.g., greater than three) ether linkages which render the molecules relatively hydrophilic and serve to make them function in a well known capacity as aqueous viscosity-increasing agents.

Thus in summary, the glycol ether smoothing agents disclosed herein may be distinguished from conventional thickeners based on their chemical formula and/or their chemical structure; and/or, when used in a wall repair compound, by the apparent viscosity-lowering effect of the smoothing agents, and/or by the absence of the relatively high shrink upon drying which is often associated with conventional thickeners.

The glycol ether smoothing agents disclosed herein may also be distinguished from relatively small, low molecular weight (e.g., less than about 500 g/mole) molecules that have multiple hydroxyls. Such low molecular weight polyhydroxy molecules have been found by the inventors not to have the advantageous effects of the glycol ether smoothing agents. For example, a wall repair formulation comprising glycerol (MW of 92 g/mole, with three hydroxyls) was found by the inventors to exhibit a much tackier consistency which lacked certain advantageous properties of the compositions described above. Such low molecular weight polyhydroxy molecules are sometimes found in wall repair compounds (for example, as mentioned in U.S. Pat. No. 4,629,751 as being useable to inhibit gelation of certain wall repair compositions). Thus, in certain embodiments, the wall repair compounds disclosed herein comprise less than 0.1, 0.05, or 0.02 percent, by weight, of low molecular weight polyhydroxy molecules.

Thus in summary, the inventors postulate, without wishing to be limited by theory or mechanism, that materials such as polyhydroxy thickeners, polyether thickeners (such as polyethylene glycol and polyethylene oxide), and even polyhydroxy small molecules (such as glycerol), may, by virtue of their sufficiently high number of hydrophilic groups such as hydroxyls and/or ether groups, interact with water in the wall repair compound, and/or with the surface of inorganic fillers in the compound, at least to increase the viscosity of the system, and possibly to form quasi-network structures. In contrast, glycol ether smoothing agents as described herein may not be as capable of forming such network structures (which may account for their failure to cause a substantially increased viscosity), and in addition appear to be able to undergo some other kind of interaction which results in the advantageous effects (e.g., apparent lowering of viscosity, increased spreadability without incurring excessive sag or slump, etc.) that have been documented herein by the inventors.

The inventors note that glycol ethers have found use in the latex paint and coatings industries, where their use is often described by those of skill in the art as facilitating the coalescence of the polymeric resin binder when the latex is dried. In the present use, in contrast, the most obvious advantageous effect of such smoothing agents appears to be the providing of a smooth consistency of the as-formulated compound rather than any obvious effect that occurs upon drying of the compound. Possibly associated with this is the fact that the inventors have found the beneficial effects of such smoothing agents to occur at levels somewhat far below the typical use of, for example, glycol ethers in the paint arts (as related, for example, in U.S. Pat. No. 4,283,320).

Thus, in various embodiments, the wall repair compounds described herein comprise one or more glycol ether smoothing agents that are present in total in an amount of at most about 2.5 percent, at most about 1.5 percent, or at most about 0.5 percent, by weight (of the total wall repair compound as formulated). In various additional embodiments, the one or more glycol ether smoothing agents are present in total in an amount of at least about 0.025 percent, at least about 0.05 percent, or at least about 0.15 percent, by weight.

Suitable glycol ether smoothing agents may be chosen for example from those glycol ethers available from Dow Chemical under the trade designation Dowanol, or those available from Dow Chemical under the trade designation Cellosolve.

In one embodiment, smoothing agents are chosen from glycol ethers that comprise exactly one hydroxyl group and exactly one ether group. This group includes, for example, propylene glycol butyl ether (available from Dow Chemical under the trade designation DOWANOL PnB), propylene glycol methyl ether (available from Dow Chemical under the trade designation DOWANOL PM), propylene glycol propyl ether (available from Dow Chemical under the trade designation DOWANOL PnP), propylene glycol phenyl ether (available from Dow Chemical under the trade designation DOWANOL PPh), ethylene glycol butyl ether (available from Dow Chemical under the trade designation Butyl CELLOSOLVE), ethylene glycol propyl ether (available from Dow Chemical under the trade designation Propyl CELLOSOLVE), ethylene glycol hexyl ether (available from Dow Chemical under the trade designation Hexyl CELLOSOLVE), ethylene glycol phenyl ether (available from Dow Chemical under the trade designation DOWANOL Eph), and mixtures thereof.

In another embodiment, smoothing agents are chosen from glycol ethers that comprise exactly one hydroxyl group and exactly two ether groups. This group includes, for example, dipropylene glycol butyl ether (available from Dow Chemical under the trade designation DOWANOL DPnB), dipropylene glycol methyl ether (available from Dow Chemical under the trade designation DOWANOL DPM), dipropylene glycol propyl ether (available from Dow Chemical under the trade designation DOWANOL DPnP), diethylene glycol butyl ether (available from Dow Chemical under the trade designation Butyl CARBITOL), diethylene glycol methyl ether (available from Dow Chemical under the trade designation Methyl CARBITOL), diethylene glycol hexyl ether (available from Dow Chemical under the trade designation Hexyl CARBITOL), diethylene glycol ethyl ether (available from Dow Chemical under the trade designation CARBITOL), mixtures thereof, and/or mixtures with the above-listed glycol ethers that comprise exactly one ether group.

In a specific embodiment, the smoothing agent is chosen from the group comprising propylene glycol butyl ether (available from Dow Chemical under the trade designation DOWANOL PnB) and ethylene glycol butyl ether (available from Dow Chemical under the trade designation Butyl CELLOSOLVE), and mixtures thereof.

In addition to the components discussed above, other components may be added to the wall repair compound. These may include, for example, water, which may be added at the end of the production process, for final adjustment of e.g., viscosity. Thus in certain embodiments water (in addition to the water present in the aqueous latex binder emulsion) may be added to the formulation. Other additives that may be present include preservatives which may have advantageous effects on the wall repair compound during storage, and may also serve to minimize the degree to which mold or fungus may grow on the dried wall repair compound. Thus in certain embodiments, the wall repair compound disclosed herein can thus comprise at least about 0.1, 0.2 or 0.3 percent by weight of a preservative or preservatives. In further embodiments, the wall repair compound disclosed herein comprises at most about 0.8 percent, 0.6 or 0.4 percent by weight of a preservative or preservatives. Suitable preservatives include, for example, those available under the designation Mergal 192 and Polyphase P20T, from Troy Corporation of Florham Park, N.J.

The wall repair compound disclosed herein can also comprise dust reducing additives which in some circumstances may serve to further reduce the quantity of airborne dust particles generated when sanding the dried, hardened wall repair compound. Exemplary additives may include oils (such as mineral oils, vegetable oils, and animal oils), waxes (including natural and synthetic waxes), and the like. Suitable additives may be chosen for example from those discussed in U.S. Pat. No. 6,358,309, herein incorporated by reference for this purpose.

Other components may also be added for various purposes, including but not limited to, antifreeze additives, surfactants, defoamers, plasticizers (e.g., for the polymeric binder used), reinforcing fibers, and so on. Such additives may be included as long as they do not detract from the properties of the wall repair compound, as related above.

It is to be understood that the following examples are merely illustrative and are in no way to be interpreted as limiting the scope of the invention.

EXAMPLES

Example 1

A batch of wall repair compound was synthesized by the following general methods. The following equipment was provided: a high shear mixer equipped with a Cowles Blade, and a low shear (Hobart) mixer. UCAR Latex 626 (binder emulsion) was obtained from Dow Chemical. K-20 Glass bubbles were obtained from 3M Company. W210 Ceramic Microspheres were obtained from 3M Company. Polyphase P20T and Mergal 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation Dowanol PnB). The UCAR 626 aqueous binder emulsion was added to a suitable sized beaker that was being stirred with an overhead driven Cowles mixing blade set on low speed. The P20T, 192, and propylene glycol butyl ether were then added sequentially, while stirring on low speed. Following this, the W210 ceramic microspheres were slowly added with the mixer initially set on low speed. As the viscosity of the mixture built upon addition of the ceramic microspheres, the mixer speed was increased. After addition was complete, mixing of this pre-mix was continued for approximately 5 minutes. The premix was then used without delay in the following step: Approximately 30 percent of the eventual total amount of glass bubble filler was added to the mixing bowl of the low shear mixer. The premix was then added to the mixer by aid of a rubber spatula and the mixer started on low speed. Slowly, the remainder of the glass bubbles was added to the low shear mixing bowl. Upon completing the addition of the glass bubbles the mixer speed was increased to medium for approximately one minute, then to high for approximately two minutes. The mixer was then stopped and the batch was inspected. The mixture was then transferred to a plastic bucket with a lid, for storage.

All components listed in Table 1 for Example 1 are in weight percent, of the wall repair compound as formulated. (UCAR 626 is an aqueous emulsion comprising 50 percent total solids, as discussed previously herein). The batch size was approximately 2 kg. It should be understood that the percentages reported for this and the other Examples herein reflect the accuracy and tolerances of the apparatus and measurements used.

TABLE 1

| Component | Weight Percent |
| --- | --- |
| UCAR Binder Emulsion 626 | 57.32 |
| K-20 Glass Bubbles | 25.95 |
| Ceramic Microspheres | 15.94 |
| Propylene Glycol Butyl Ether | 0.24 |
| Polyphase P20T | 0.42 |
| Mergal 192 | 0.11 |

Example 2

A batch of wall repair compound was synthesized by the following general methods. The following equipment was provided: a high shear mixer equipped with a Cowles Blade, and a low shear (Hobart) mixer. UCAR Latex 626 (binder emulsion) was obtained from Dow Chemical. K-20 Glass bubbles were obtained from 3M Company. W210 Ceramic Microspheres were obtained from 3M Company. Polyphase P20T and Mergal 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation Dowanol PnB). The UCAR 626 aqueous binder emulsion was added to a suitable sized beaker that was being stirred with an overhead driven Cowles mixing blade set on low speed. The P20T, 192, and propylene glycol butyl ether were then added sequentially, while stirring on low speed. Following this, the W210 ceramic microspheres were slowly added with the mixer initially set on low speed. As the viscosity of the mixture built upon addition of the ceramic microspheres, the mixer speed was increased. After addition was complete, mixing of this pre-mix was continued for approximately 5 minutes. The premix was then used without delay in the following step: Approximately 30 percent of the eventual total amount of glass bubble filler was added to the mixing bowl of the low shear mixer. The premix was then added to the mixer by aid of a rubber spatula and the mixer started on low speed. Slowly, the remainder of the glass bubbles was added to the low shear mixing bowl. Upon completing the addition of the glass bubbles the mixer speed was increased to medium for approximately one minute, then to high for approximately two minutes. The mixer was then stopped and the batch was inspected. Make-up water was then added to adjust the viscosity as desired and the mixer was operated again at high speed for a short time, until the batch appeared uniform. The mixture was then transferred to a plastic bucket with a lid, for storage.

All components listed in Table 2 for Example 2 are in weight percent, of the wall repair compound as formulated. (The weight percent listed for Make-up Water refers to water added as described above for viscosity adjustment, in addition to the water present in the UCAR emulsion). The batch size was approximately 1.8 kg.

TABLE 2

| Component | Weight Percent |
| --- | --- |
| UCAR Binder Emulsion 626 | 55.63 |
| K-20 Glass Bubbles | 25.18 |
| Ceramic Microspheres | 15.48 |
| Propylene Glycol Butyl Ether | 0.048 |
| Polyphase P20T | 0.41 |
| Mergal 192 | 0.10 |
| Make-up Water | 3.15 |

Example 3

A batch of wall repair compound was synthesized by the following general methods. The following equipment was provided: a high shear mixer equipped with a Cowles Blade, and a low shear (Hobart) mixer. UCAR Latex 626 (binder emulsion) was obtained from Dow Chemical. K-20 Glass bubbles were obtained from 3M Company. W210 Ceramic Microspheres were obtained from 3M Company. Polyphase P20T and Mergal 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation Dowanol PnB). The UCAR 626 aqueous binder emulsion was added to a suitable sized beaker that was being stirred with an overhead driven Cowles mixing blade set on low speed. The P20T, 192, and propylene glycol butyl ether were then added sequentially, while stirring on low speed. Following this, the W210 ceramic microspheres were slowly added with the mixer initially set on low speed. As the viscosity of the mixture built upon addition of the ceramic microspheres, the mixer speed was increased. After addition was complete, mixing of this pre-mix was continued for approximately 5 minutes. The premix was then used without delay in the following step: Approximately 30 percent of the eventual total amount of glass bubble filler was added to the mixing bowl of the low shear mixer. The premix was then added to the mixer by aid of a rubber spatula and the mixer started on low speed. Slowly, the remainder of the glass bubbles was added to the low shear mixing bowl. Upon completing the addition of the glass bubbles the mixer speed was increased to medium for approximately one minute, then to high for approximately two minutes. The mixer was then stopped and the batch was inspected. Make-up water was then added to adjust the viscosity as desired and the mixer was operated again at high speed for a short time, until the batch appeared uniform. The mixture was then transferred to a plastic bucket with a lid, for storage.

All components listed in Table 3 for Example 3 are in weight percent, of the wall repair compound as formulated. (The weight percent listed for Make-up Water refers to water added as described above for viscosity adjustment, in addition to the water present in the UCAR emulsion). The batch size was approximately 1.8 kg.

TABLE 3

| Component | Weight Percent |
| --- | --- |
| UCAR Binder Emulsion 626 | 55.23 |
| K-20 Glass Bubbles | 25.00 |
| Ceramic Microspheres | 15.37 |
| Propylene Glycol Butyl Ether | 2.07 |
| Polyphase P20T | 0.40 |
| Mergal 192 | 0.10 |
| Make-up Water | 1.81 |

Example 4

A batch of wall repair compound was synthesized by the following general methods. The following equipment was provided: a high shear mixer equipped with a Cowles Blade, and a low shear (Hobart) mixer. UCAR Latex 626 (binder emulsion) was obtained from Dow Chemical. K-20 Glass bubbles were obtained from 3M Company. Calcium carbonate was obtained from EMD Chemicals under the trade designation CX01105. Polyphase P20T and Mergal 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation Dowanol PnB). The desired amount of water was added to a suitable sized beaker that was then stirred with an overhead driven Cowles mixing blade set on low speed. The xanthan gum was then slowly added. As the gum dissolved in the water the viscosity increased and the speed of the mixer was increased. The propylene glycol butyl ether and the Mergal 192 were then added while stirring continued. Following this, the calcium carbonate was slowly added with high speed stirring. This premix was then added below as follows.

The low shear mixer bowl was charged with the UCAR 626 and the Polyphase P20T. The above premix was then added and the mixture stirred at low speed until relatively homogeneous. The K-20 glass bubbles were then slowly added with low speed stirring continuing. After addition of the glass bubbles was complete, the mixer was operated at high speed for approximately one minute. The mixing bowl was then lowered and the wall of the bowl was scraped with a spatula to make sure no cavities or pockets remained. The mixing bowl was then replaced in position and the mixer operated for approximately one additional minute at high speed. The mixer was then stopped and the batch was inspected. The mixture was then transferred to a plastic bucket with a lid, for storage.

All components listed in Table 4 for Example 4 are in weight percent, of the wall repair compound as formulated. (The weight percent listed for Water refers to water added initially as described above, in addition to the water present in the UCAR emulsion). The batch size was approximately 1 kg.

TABLE 4

| Component | Weight Percent |
| --- | --- |
| UCAR Binder Emulsion 626 | 48.26 |
| K-20 Glass Bubbles | 21.85 |
| Calcium Carbonate | 16.78 |
| Propylene Glycol Butyl Ether | 0.20 |
| Polyphase P20T | 0.36 |
| Mergal 192 | 0.09 |
| Xanthan Gum | 0.05 |
| Water | 12.41 |

Example 5

A batch of wall repair compound was synthesized by the following general methods. The following equipment was provided: a high shear mixer equipped with a Cowles Blade, and a low shear (Hobart) mixer. UCAR Latex 626 (binder emulsion) was obtained from Dow Chemical. K-20 Glass bubbles were obtained from 3M Company. Calcium carbonate was obtained from EMD Chemicals under the trade designation CX01105. Polyphase P20T and Mergal 192 biocides were obtained from Troy Corporation. Ethylene glycol butyl ether (CAS Number 111-76-2) was obtained from Sigma-Aldrich, St. Louis, Mo., under the product number 48, 428-8 (and is believed to be substantially equivalent to the product obtainable from Dow Chemical under the trade designation Butyl CELLOSOLVE). The desired amount of water was added to a suitable sized beaker that was then stirred with an overhead driven Cowles mixing blade set on low speed. The ethylene glycol butyl ether and the Mergal 192 were then added while stirring continued. Following this, the calcium carbonate was slowly added with high speed stirring. This premix was then added below as follows.

The low shear mixer bowl was charged with the UCAR 626 and the Polyphase P20T. The above premix was then added and the mixture stirred at low speed until relatively homogeneous. The K-20 glass bubbles were then slowly added with low speed stirring continuing. After addition of the glass bubbles was complete, the mixer was operated at high speed for approximately one minute. The mixing bowl was then lowered and the wall of the bowl were scraped with a spatula to make sure no cavities or pockets remained. The mixing bowl was then replaced in position and the mixer operated for approximately one additional minute at high speed. The mixer was then stopped and the batch was inspected. The mixture was then transferred to a plastic bucket with a lid, for storage.

All components listed in Table 5 for Example 5 are in weight percent, of the wall repair compound as formulated. (The weight percent listed for Water refers to water added initially as described above, in addition to the water present in the UCAR emulsion). The batch size was approximately 0.3 kg.

TABLE 5

| Component | Weight Percent |
| --- | --- |
| UCAR Binder Emulsion 626 | 48.28 |
| K-20 Glass Bubbles | 21.86 |
| Calcium Carbonate | 16.79 |
| Ethylene Glycol Butyl Ether | 0.21 |
| Polyphase P20T | 0.36 |
| Mergal 192 | 0.09 |
| Water | 12.42 |

Samples made according to the compositions and procedures of Examples, 1, 2, 3, 4 and 5 were found by the inventors to exhibit advantageously smooth consistency; easy spreadability; and, resistance to sagging, running or slumping when applied to a vertical wall.

Shrink Measurement

Because the wall repair compounds described herein typically comprised a density (specific gravity) less than that of water and of common oils and liquids, the compounds were not easily characterizable by conventional shrink measurements that rely on measuring an amount of liquid displaced. Accordingly, a simple, semi-quantitative method of ascertaining shrinkage was developed. A lid (from a 1 gallon glass jar) measuring approximately 3.5 inches in diameter and approximately 0.4 inches deep was completely filled with a sample of wall repair compound. The exposed (top) surface of the sample was leveled even with the upper edge of the lid by running a wide putty knife over the surface of the sample. The sample was then allowed to dry for three days under ambient (room) conditions.

After the completion of the three days drying, the sample was inspected for any cracking. The sample was also inspected for shrinkage (which would be manifested as a depression of the exposed surface of the dried wall repair compound below the upper edge of the lid). Any such depression could be measured and used in combination with the volume of material in the sample, to obtain a semi-quantitative estimate of the shrinkage that occurred in drying.

For samples made according to the compositions and procedures of Examples, 1, 2, 3, 4 and 5, no cracking was observed. For these samples, any depression of the exposed surface relative to the lid rim edge appeared to be at or below an amount observable to the eye. The minimum amount of such depression which would be observable to the eye being estimated by the inventors as being a few thousandths of an inch, it was thus conservatively estimated that these samples exhibited a shrinkage upon drying of less than about 2.5 percent (e.g., 0.010 inch (ten thousandths of an inch) divided by 0.4 inch).

A number of embodiments of the invention have been described. Nevertheless, it will be understood that various modifications may be made without departing from the invention. Within the guidelines presented herein, it is possible to vary the composition of the wall repair compounds as desired for particular purposes. For example, the inventors have found that increasing the amount of glass bubbles in the formulation relative to the amount of ceramic microspheres, may produce a dried compound that is easier to sand. In further example, the inventors have found that increasing the amount of ceramic microspheres in the formulation relative to the amount of glass bubbles, may produce a dried compound of higher hardness. In making such adjustments, or in general, the viscosity of the compound may be varied as desired by way of increasing or decreasing the amount of aqueous binder latex and/or the amount of added water. All such variations and combinations are contemplated by the inventor as being within the bounds of the conceived invention. Accordingly, all such embodiments are within the scope of the following claims.

What is claimed is:

1. A wall repair compound, comprising,
   from about 20 percent to about 80 percent by weight aqueous latex binder emulsion;
   from about 20 percent to about 70 percent by weight of an inorganic filler system,
      wherein the inorganic filler system is comprised of at least 95% by weight of synthetic inorganic filler, which synthetic inorganic filler comprises substantially spherical synthetic particles comprising glass bubbles;
   from about 0.025 percent by weight, to 2.5 percent by weight, of at least one glycol ether smoothing agent that comprises exactly one hydroxyl group and exactly one or exactly two ether groups; and,
   less than about 0.1 percent by weight of organic polymeric thickener.

2. The compound of claim 1 wherein the synthetic inorganic filler further comprises ceramic microspheres, with the ratio of the median particle size of the glass bubbles to the median particle size of the ceramic microspheres being in the range of about 5:1 to about 40:1.

3. The compound of claim 2 wherein the weight ratio of the glass bubbles to the ceramic microspheres is from about 1:1 to about 3:1.

4. The compound of claim 1, wherein the inorganic filler system comprises titanium dioxide.

5. The compound of claim 1, wherein the inorganic filler system comprises calcium carbonate.

6. The compound of claim 1 wherein the inorganic filler system comprises from about 30 percent to about 50 percent by weight of the compound.

7. The compound of claim 1 wherein the at least one glycol ether smoothing agent is present at from about 0.05 percent to about 1.5 percent by weight of the compound.

8. The compound of claim 1 wherein the at least one glycol ether smoothing agent is present at from about 0.15 percent to about 0.5 percent by weight of the compound.

9. The compound of claim 1 wherein the at least one glycol ether smoothing agent comprises exactly one hydroxyl group and exactly one ether group, and is selected from the group consisting of propylene glycol butyl ether, propylene glycol methyl ether, propylene glycol propyl ether, propylene glycol phenyl ether, ethylene glycol butyl ether, ethylene glycol propyl ether, ethylene glycol hexyl ether, and ethylene glycol phenyl ether, and mixtures thereof.

10. The compound of claim 1 wherein the at least one glycol ether smoothing agent comprises exactly one hydroxyl group and exactly two ether groups, and is selected from the group consisting of dipropylene glycol butyl ether, dipropylene glycol methyl ether, dipropylene glycol propyl ether, diethylene glycol butyl ether, diethylene glycol methyl ether, diethylene glycol hexyl ether, and diethylene glycol ethyl ether, and mixtures thereof, and mixtures thereof with glycol ethers that comprise exactly one ether group.

11. The compound of claim 1 wherein the at least one glycol ether smoothing agent is selected from the group consisting of propylene glycol butyl ether and ethylene glycol butyl ether and mixtures thereof.

12. The compound of claim 1 wherein the aqueous latex binder emulsion comprises a binder with a glass transition temperature of between 15° C. and 35° C.

13. The compound of claim 1 wherein the aqueous latex binder emulsion comprises an acrylic binder.

14. The compound of claim 1, further comprising an antifreeze additive.

15. The compound of claim 1 further comprising one or more dust reducing additives chosen from the group consisting of oils, waxes and mixtures thereof.

16. A wall repair compound, comprising,
from about 20 percent to about 80 percent by weight aqueous latex binder emulsion;
from about 20 percent to about 70 percent by weight of an inorganic filler system,
  wherein the inorganic filler system is comprised of at least 95% by weight of synthetic inorganic filler, which synthetic inorganic filler comprises substantially spherical synthetic particles comprising glass bubbles;
from about 0.025 percent by weight, to 2.5 percent by weight, of at least one glycol ether smoothing agent that comprises exactly one hydroxyl group and exactly one or exactly two ether groups; and,
less than about 0.1 percent by weight, in total, of organic polymeric thickener chosen from the group consisting of: polyhydroxyl compounds with ten or more hydroxyl groups; polysaccharides; cellulose ethers; polyethylene glycol; polyethylene oxide; polyethylene oxide/polypropylene oxide copolymers; polyvinyl alcohol; polymers and copolymers of ethylenically unsaturated carboxylic acids and their derivatives; polyacrylic acid; polyacrylamide; guar gum; xanthan gum; alginates; tragacanth gum; pectin; amylopectin; dextran; polydextrose; and mixtures thereof.

17. The compound of claim 16, wherein the inorganic filler system comprises calcium carbonate.

18. The compound of claim 16, wherein the inorganic filler system comprises titanium dioxide.

19. The compound of claim 16, with the proviso that the wall repair compound does not comprise a dust reducing additive chosen from the group consisting of oils, waxes and mixtures thereof.

* * * * *

UNITED STATES PATENT AND TRADEMARK OFFICE
CERTIFICATE OF CORRECTION

PATENT NO.         : 8,691,889 B2  
APPLICATION NO.    : 13/938770  
DATED              : April 8, 2014  
INVENTOR(S)        : John Gozum Page 1 of 1

It is certified that error appears in the above-identified patent and that said Letters Patent is hereby corrected as shown below:

Title Page, Item (57) (Abstract) Line 7,
After "selected" delete "such that".

Signed and Sealed this

Fourth Day of November, 2014

Michelle K. Lee
*Deputy Director of the United States Patent and Trademark Office*